United States Patent [19]

Wilhelmsen

[11] Patent Number: 4,891,034

[45] Date of Patent: Jan. 2, 1990

[54] DRIVE COUPLING

[76] Inventor: Arne Wilhelmsen, 4897 Patrick Pl., Burnaby, British Columbia, Canada

[21]* Appl. No.: 118,114

[22] Filed: Nov. 6, 1987

[51] Int. Cl.⁴ .................................................. F16D 1/02
[52] U.S. Cl. ...................................... 464/87; 403/300; 464/182; 464/903
[58] Field of Search .................... 464/87, 92, 106, 157, 464/903, 182; 403/300, 305

[56] References Cited

U.S. PATENT DOCUMENTS

| | | | |
|---|---|---|---|
| 349,678 | 9/1886 | Applegate | 403/300 |
| 1,157,921 | 10/1915 | Banks . | |
| 1,229,417 | 6/1917 | Daft . | |
| 1,684,919 | 9/1928 | Keyser | 464/182 X |
| 2,290,421 | 7/1942 | Fitzgerald . | |
| 2,755,900 | 7/1956 | Seyfried | 464/87 X |
| 2,830,445 | 4/1958 | Kressin | 464/87 |
| 2,892,327 | 6/1959 | Kressin | 464/87 |
| 3,112,625 | 12/1963 | Leto . | |
| 3,274,799 | 9/1966 | Danner . | |
| 3,296,827 | 1/1967 | Landon, Jr. et al. . | |
| 3,512,375 | 5/1970 | Madarasz et al. | 464/106 |
| 3,542,178 | 11/1970 | Ripple | 464/87 X |
| 3,610,781 | 10/1971 | Kolb et al. | 464/92 X |
| 3,724,239 | 4/1973 | Calistrat . | |
| 3,873,863 | 3/1975 | Pew . | |
| 3,973,867 | 8/1976 | Lee | 464/87 X |
| 4,228,664 | 10/1980 | McCoy | 464/92 |

FOREIGN PATENT DOCUMENTS 1145864 3/1963 Fed. Rep. of Germany ...... 464/182
1589221 5/1981 United Kingdom ............... 403/300

Primary Examiner—Daniel P. Stodola
Attorney, Agent, or Firm—Townsend & Townsend

[57] ABSTRACT

A drive coupling for transmitting rotary motion from an input shaft to an output shaft is provided. The drive coupling comprises a male member formed from plastic having a protruding flange, and a female member formed from plastic with a cavity shaped to accept the protruding flange of the male member. The male and female members are secured to the ends of the shafts to be coupled in such a manner that the protruding flange of the male member is fitted into the correspondingly shaped cavity of the female member whereby the members are joined such that rotary motion of one member is transmitted to the other member. Preferably, the male and female members of the drive coupling are made from polyurethane having a hardness of 80 on the Shore Durometer A scale.

7 Claims, 2 Drawing Sheets

DRIVE COUPLING

This invention relates to a coupling. More specifically, this invention relates to a coupling for transmitting drive from an electric motor to a hot water circulation pump.

DESCRIPTION OF THE PRIOR ART

Drive couplings are often used to connect the drive shaft of a power source to the driven shaft of a device using the power. Prior art examples of coupling members are disclosed in the following United States Patents:

| | |
|---|---|
| 4,516,951 | Saigo et al |
| 4,228,664 | McCoy |
| 3,873,863 | Pew |
| 3,724,239 | Calistrat |
| 3,296,827 | Landon |
| 3,274,799 | Danner |
| 3,112,625 | Leto |
| 2,892,327 | Kressin |
| 2,290,421 | Fitzgerald |
| 1,229,417 | Daft |
| 1,157,921 | Banks |

SUMMARY OF THE INVENTION

The present invention is a drive coupling for transmitting rotary motion from an input shaft to an output shaft comprising a male member formed from plastic having a protruding flange, a female member formed from plastic with a cavity shaped to accept said protruding flange of said male member, said male and female members having means for securing said members to the ends of the shafts to be coupled in such a manner that said protruding flange of said male member is fitted into the correspondingly shaped cavity of said female member whereby said members are joined such that rotary motion of one member is transmitted to the other member.

The coupling of the present invention is preferably formed from a polyurethane having a hardness of 80 on the Shore Durometer A scale.

The present coupling is particularly suited for use in the plumbing industry as a replacement coupling for conventional couplings which comprise a pair of bronze bushes, permanently joined by a spring, that are received on the drive shaft of a circulation pump and the drive shaft of a small electric motor. Torque is transmitted from the motor to the pump via the spring. These couplings are commonly referred to as a spider spring couplings. These couplings are a major problem for plumbers doing maintenance work. Aside from not being particularly robust, removal and replacement of the prior art couplings once they are damaged is a time consuming and difficult job. The task is hampered by the fact that most of the repairs have to be made on site in often cramped and poorly lit conditions.

Accordingly, the present invention seeks to remedy these shortcomings by providing a drive coupling that is compact, strong and durable yet easy to remove and replace when necessary.

Since the pumps circulate water through buildings where water radiators act as amplifiers, a further aim of the present invention is to provide a coupling that minimizes noise and vibration.

A further object of the invention is to provide a coupling that does not produce end thrust and therefore does not adversely wear motor or pump bearings.

BRIEF DESCRIPTION OF THE DRAWINGS

Various embodiments of the present invention are illustrated in the following drawings in which.

DESCRIPTION OF THE PREFERRED EMBODIMENTS

Figure 1:
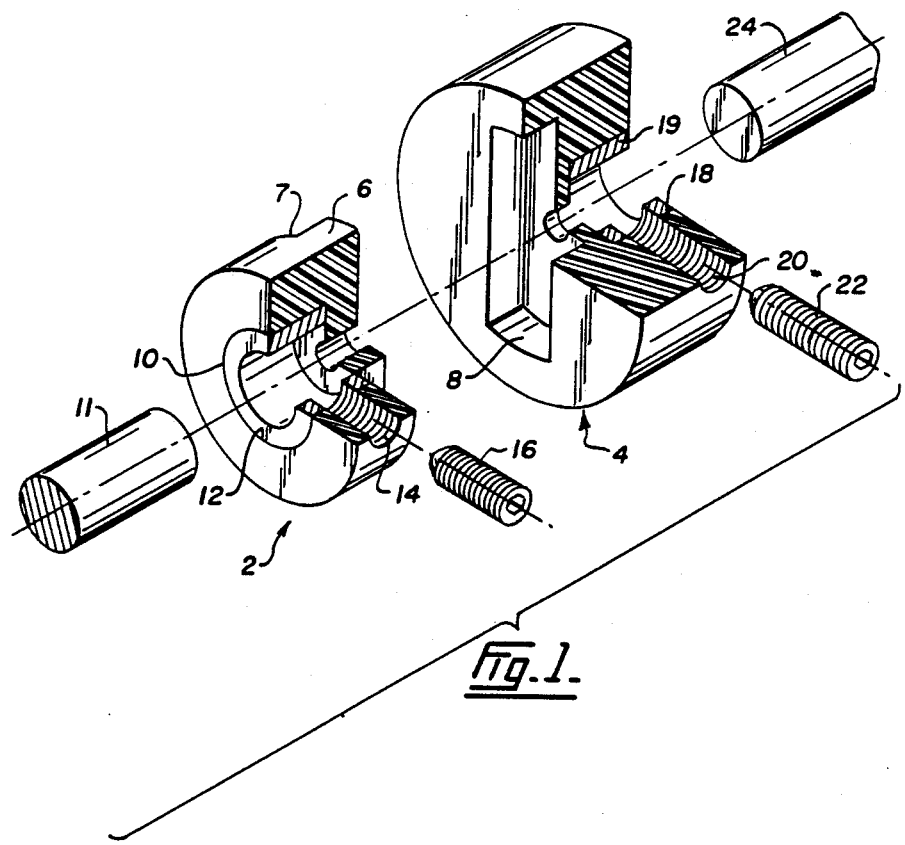
FIG. 1 is an exploded view of an embodiment of the present invention.
Figure 3:
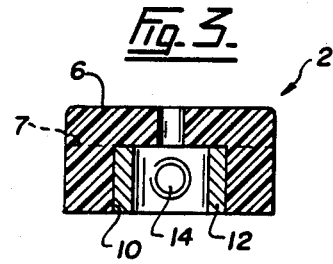
FIG. 3 is a cross sectional view of the male coupling member of the embodiment of FIG. 1.

Referring to FIG. 1 there is shown a first embodiment of the drive coupling device. The coupling comprises a cylindrical male member 2 and a slightly larger diameter, cylindrical female member 4. Both members are preferably formed of polyurethane of hardness 80 for the best sound and vibration absorption and wear characteristics. A raised lug or flange 6 bisects the mating surface 7 of the male member and a circular recess 10 extending a distance along the axis of the male member is formed in the opposite face. Recess 10 accepts a bronze bush 12. The bush provides a wear surface, as well as a means for varying the diameter of the recess 10 in order that the coupling may be fitted to different diameter shafts. The drive shaft 11 of either the pump or the motor fits tightly within bronze bush 12 of recess 10. Threaded hole 14, perpendicular to the central axis of the cylindrical male member, extends radially through male member 2 and an aligned hole in bushing 12 to communicate with recess 10. Hole 14 threadably receives an allen screw 16, which when fully tightened into the hole, bears against shaft 11 inserted in recess 10 thereby serving to positively locate member 2 on the shaft. Male member 2 is shown completely sectioned in FIG. 3.

Figure 2:
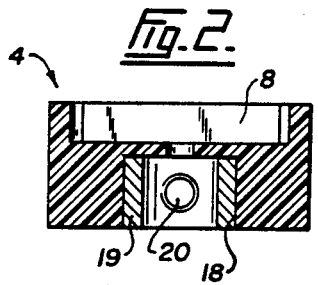
FIG. 2 is a cross sectional view of the female coupling member of the embodiment of FIG. 1.

Female member 4 is formed in a manner similar to that of member 2. Member 4 has a circular axially aligned and extending recess 18 formed in the rear face of the member. A bronze bushing 19 is fitted in recess 18, and a threaded hole 20 extends radially through member 4 and through bronze bushing 18 to communicate with recess 18. Allen screw 22 is tightened into hole 20 in order to secure female member 4 onto shaft 24. An essentially rectangular cavity 8 is formed in the mating surface of member 4 and is correspondingly shaped to accept flange 6 of male member 2. Female member 3 is shown completely sectioned in FIG. 2.

In use, male member 2 and female member 4 are positioned on co-linear shafts 11 and 24 respectively. Flange 6 of male member 2 is slidably received in cavity 8 formed in female member 4 so that any rotational force transmitted by shaft 24 is transferred through the coupling device to shaft 11.

Figure 4:
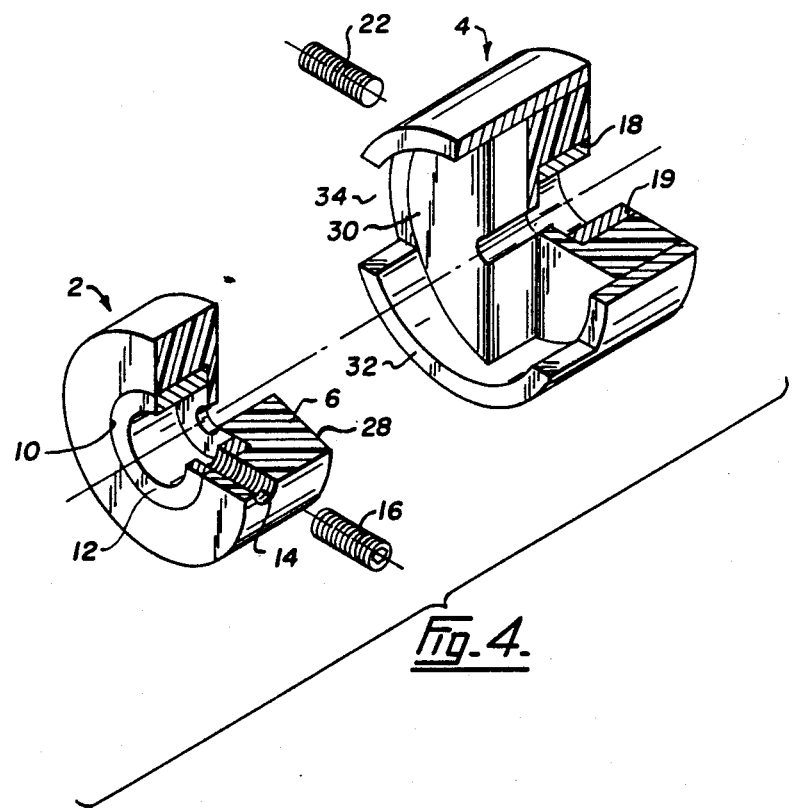
FIG. 4 is an exploded view of a second embodiment of the present invention.
Figures 5, 6:
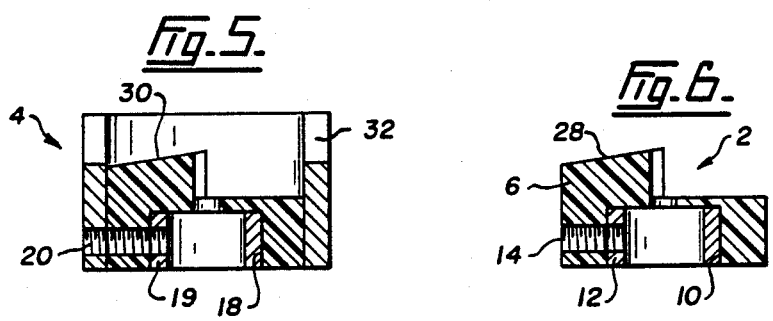
FIG. 5 is a cross sectional view of the female coupling member of the embodiment of FIG. 4.
FIG. 6 is a cross sectional view of the male coupling member of the embodiment of FIG. 4.

FIG. 4 through 6 illustrate an alternative embodiment of the present invention. Analogous parts to those of the first embodiment are identically numbered. In this embodiment, the mating surface of male member 2 is sectioned to provide a stepped surface having semi-cylindrical flange 6. Preferably, the surface 28 of semi-cylindrical flange 6 is angled slightly as shown in FIG. 6 sloping downwardly from the edge of the flange adjacent the longitudinal axis of the male member to the outer edge of the member. Mating surface of female member 4 also comprises a stepped surface having a semi-cylindrical flange. Preferably, surface 30 of the flange is also angled in the same manner as the flange surface of the male member as is shown in FIG. 5. Axially extending sleeve 32 encompasses female member 4 to define a mating cavity to accept male member 2. Sleeve 32 acts to axially align male member 2 with female member 4 when the mating surfaces of each member interlock to form a complete cylinder and prevents lateral displacement of the coupling members. Windows 34 in sleeve 32 allow access to screw 16 of male member 2 when the male member is fully engaged in female member 4.

The coupling of the present invention overcomes several of the shortcomings of the spider spring couplings presently used in the plumbing industry to couple the shaft of an electric motor with a water circulation pump. The spider spring coupling uses a spring to interconnect two bushings mounted on the shafts to be coupled. The spring connector of this arrangement creates an axial thrust on the shafts of the motor or pump leading, eventually, to the pump seal leaking or the motor bearing failing. The coupling of the present invention exerts no axial thrust on the shafts being coupled and therefore does not adversely wear pump or motor bearings.

The spring member of the spider spring coupling does not have the sound and vibration absorbtion characteristics of the present invention. The water circulation pumps are often used to circulate water through buildings where radiators act as amplifiers so that low noise and vibration free operation is important. The present coupling transmits motion through a coupling made of resilient polyurethane so that vibration is absorbed and thus noise is significantly reduced.

Problems exist with replacing the conventional spider spring coupling when it breaks down. When removing or installing a new coupling, the spring must be compressed with considerable force to fit the attached bushings between and then over the shafts to be joined. Such an operation must often be conducted on site usually on a ladder between heating pipes with very poor lighting conditions. The coupling of the present invention is very much easier to install, its compact, two part construction allowing the male and female members to be attached independently to each shaft and then slid axially along the shaft until the two mating surfaces engage whereupon screw fasteners 16 and 22 can be tightened into place to securely locate each member.

I claim:

1. A drive coupling for transmitting rotary motion between a pair of shafts to be coupled comprising a male member and a female member formed from a rigid plastic material, each member having a longitudinal axis co-axial with the axis of the shafts, an attachment face with means for securing the member to the end of a shaft to be coupled comprising a recess formed in said attachment face, a threaded channel extending through said member at right angles to the longitudinal axis of said member to intersect said recess; and a threaded fastener housed in said channel for tightening into said channel to protrude into said recess in order to abut and clamp a shaft inserted into said recess and a mating face, said mating face of said male member having a semi-cylindrical flange, and said mating face of said female member having a semi-cylindrical flange and an outer sleeve about the periphery of said mating face to define a tubular cavity to accept said male semi-cylindrical flange, said outer sleeve being formed with apertures therein to allow access to said threaded fasteners when said drive coupling is operatively installed such that the semi-cylindrical flanges of said male and female members interfit within said tubular cavity to transmit rotary motion.

2. A drive coupling as claimed in claim 1 in which said male and female members are made from polyurethane having a hardness of 80 on the Shore Durometer A scale.

3. A drive coupling as claimed in claim 1 in which said semi-cylindrical flanges are formed with a sloping mating face which slopes downwardly from the axis of said member to the outer perimeter of said member.

4. A drive coupling as claimed in claim 1 3 in which said threaded fastener is an allen screw.

5. A drive coupling as claimed in claim 1 in which said recess of said attachment face is circular to receive a circular shaft.

6. A drive coupling as claimed in claim 1 in which said recess of said attachment face is fitted with a bushing having an aperture through its periphery to allow for passage of said threaded fastener into said recess.

7. A drive coupling as claimed in claim 6 in which said bushing is made from bronze.

* * * * *